Dec. 8, 1931.  E. I. SPONABLE  1,835,536
MOVING SOUND PICTURE FILM
Filed Dec. 14, 1928
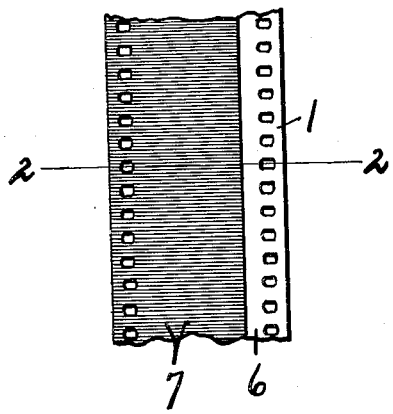
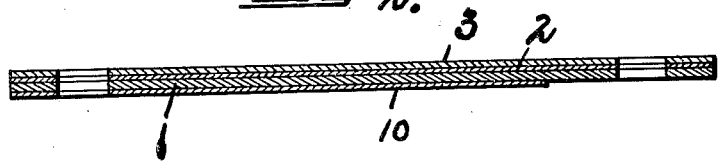
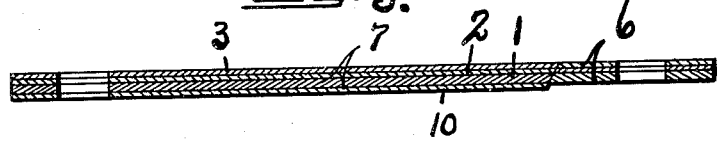
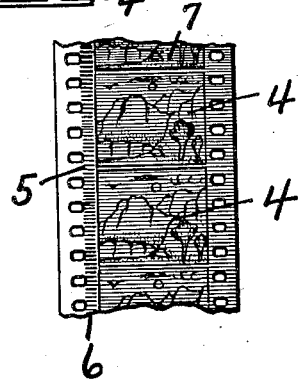

Patented Dec. 8, 1931

1,835,536

UNITED STATES PATENT OFFICE

EARL I. SPONABLE, OF NEW YORK, N. Y.

MOVING SOUND PICTURE FILM

Application filed December 14, 1928. Serial No. 326,012.

This invention relates to certain new and useful improvements in moving sound picture film, or so-called "talking" moving picture film.

In the past it has been impossible to use film with a tinted base in the production and reproduction of sound pictures inasmuch as the photo-electric cell used in reproduction is more sensitive to certain particular colors than to others, as for instance, the usual photo-electric cell is particularly sensitive to blue. Hence, when a tinted stock of red, amber or yellow is used, the volume of the reproduced sound falls off materially. Further, there is also a difference in the quality of the reproduction as compared to black and white film when tinted stock is used.

The object, therefore, of this invention is to provide a moving talking picture film in which the picture portion of the film is tinted without affecting the normal substantial transparency or clearness of the sound track.

In the drawings:—

Figure 1 is a plan view of a section of a moving talking picture film of this invention.

Figure 2 is a section on line 2—2, Figure 1.

Figure 3 is a section similar to Figure 2 illustrating a film produced by a modified method.

Figure 4 is a view of a section of a film having a tainted moving picture section and an untinted sound track section.

As illustrated, a film may consist of a celluloid base —1— to which there is secured a sub-base —2— of such a material as to cause the emulsion to cling or stick to the cellulose nitrate, the usual gelatin layer being indicated at —3—.

In the manufacture of the film the celluloid base —1— is tinted or colored in any suitable manner, as for instance by moving the celluloid strip over an absorbent roll which contains the coloring matter. During this step of the process the sound track —6— may be covered in any suitable manner so as to be protected from contact with the absorbent roll. In this manner the picture portion —7— of the film may be provided with a color coating —10— or may be tinted any desired color, while the sound track —6— retains its original untinted substantially transparent condition. Thereafter the sub-base and the gelatin layer may be applied to the celluloid base —1— in the usual manner.

The film so produced may be provided in the usual manner with consecutive pictures —4— overlying the tinted portion of the celluloid base —1—, while the sound record —5— may be produced in any usual manner upon the sound track —6— which overlies the untinted portion of the base —1—. Such a film has all the advantages so far as the moving picture is concerned of the usual tinted film while the sound record portion of the film has all of the usual advantages of a sound record upon the ordinary untinted film.

In Figure 3 a modified form of film is shown in that the picture portion —7— of the film is formed independently of the sound track portion —6—, or the sound track portion may be cut from the picture portion —7— prior to tinting the base —1—. Thereafter the base of the picture portion —7— may be tinted a desired color, while the base of the sound track portion remains untinted and the two portions are then united or secured together in any suitable manner, as for instance that disclosed in my co-pending application Serial No. 344,184.

As illustrated, the parts are cut with inclined mating surfaces, and these surfaces may be secured together by any suitable adhesive. In this manner the moving picture portion of the film may have a tinted base —1—, while the sound track record has an unprinted base-portion —1—. It may be that other methods of producing such a film may be devised, and I do not desire to restrict myself to the particular means by which the result is secured, as various changes and modifications may be made within the scope of the appended claim.

I claim:

A composite film comprising two longitudinal strips, one consisting of a base, a sub-base secured thereto, a photo-sensitive layer secured to the sub-base to constitute an untinted sound track portion and the other strip consisting of a base, a sub-base secured thereto, a photo-sensitive layer secured to the sub-base, a coloring matter layer secured to the base, and means for securing the adjacent longitudinal edges of the strips together with the bases aligned to produce a unitary article.

In witness whereof I have hereunto set my hand this 3rd day of December, 1928.

EARL I. SPONABLE.